(12) United States Patent
Drake et al.

(10) Patent No.: US 8,804,736 B1
(45) Date of Patent: Aug. 12, 2014

(54) NETWORK TUNNELING USING A LABEL STACK DELIMITER

(75) Inventors: John E. Drake, Pittsburgh, PA (US); Rahul Aggarwal, Menlo Park, CA (US); Nitin Bahadur, Santa Clara, CA (US); Nischal Sheth, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 167 days.

(21) Appl. No.: 13/243,450

(22) Filed: Sep. 23, 2011

(51) Int. Cl.
*H04L 12/28* (2006.01)

(52) U.S. Cl.
USPC .......................................................... 370/392

(58) Field of Classification Search
CPC .................... H04L 26/0653; H04L 26/06095; H04L 26/06102; H04L 47/74
USPC .......................................................... 370/392
See application file for complete search history.

(56) References Cited

U.S. PATENT DOCUMENTS

| 7,433,963 B2 * | 10/2008 | Anschutz .................... 709/236 |
| 8,144,710 B2 * | 3/2012 | McGuire et al. ............ 370/392 |
| 2010/0043068 A1 * | 2/2010 | Varadhan et al. ............. 726/15 |
| 2011/0216772 A1 * | 9/2011 | Mohan et al. ................ 370/392 |

OTHER PUBLICATIONS

Rosen et al. "MPLS Label Stack Encoding", RFC 3032, The Standards Track, The Internet Society, 2001, p. 1-24.
Ohta, "Assignment of the 'OAM Alert Label' for Multiprotocol Label Switching Architecture (MPLS) Operation and Maintenance (OAM) Functions" RFC 3429, Network Working Group, The Internet Society, 2002, p. 1-7.
Rosen, "Removing a Restriction on the use of MPLS Explicit NULL" RFC 4182, Network Working Group, The Internet Society, 2005, p. 1-8.
Andersson et al. "Multiprotocol Label Switching (MPLS) Label Stack Entry: 'EXP' Field Renamed to 'Traffic Class' Field", RFC 5462, Network Working Group, The Internet Society 2009, p. 1-10.
Bryant et al. "Pseudowire Emulation Edge-to-Edge (PWE3) Control Word for Use over an MPLS PSN", RFC 4385, Network Working Group, The Internet Society, 2006, p. 1-13.
Bocci et al. "MPLS Generic Associated Channel" RFC 5586, Network Working Group, IETF Trust, 2009, p. 1-20.
Kompella et al. "Link Building in MPLS Traffic Engineering (TE)", RFC 4201, Network Working Group, Standards Track, The Internet Society, Oct. 2005, p. 1-12.
Shiomoto et al. "Procedures for Dynamically Signaled Hierarchical Label Switched Paths" Internet Draft, Network Working Group, Feb. 2010, p. 1-24.
Andersson et al. "LDP Specification", RFC 5036, Standards Track, Network Working Group, Oct. 2007, p. 1-136.

(Continued)

*Primary Examiner* — Phuc Tran
(74) *Attorney, Agent, or Firm* — Shumaker & Sieffert, P.A.

(57) ABSTRACT

An ingress router of a provider network receives a packet from a customer network, determines that the packet includes a customer network label and that the packet is to be tunneled through the provider network, based on the determination, adds a delimiter label to the packet indicative of a bottom of a provider network label stack and one or more provider network labels to the packet, and forwards the packet to a next routing device along the provider network tunnel. An egress routing device of the provider network receives a packet comprising a provider network label stack, removes the provider network label stack from the packet, determines whether the packet comprises a delimiter label following the provider network label stack, and, when the packet comprises the delimiter label, forwards the packet to a customer network interface device.

16 Claims, 7 Drawing Sheets

(56) References Cited

OTHER PUBLICATIONS

Awduche et al. "RSVP-TE: Extensions to RSVP for LSP Tunnels", RFC 3209, Standards Track, Network Working Group, Dec. 2001, p. 1-57.

Farrel et al. "Inter-Domain MPLS and GMPLS Traffic Engineering—Resource Reservation Protocol—Traffic Engineering (RSVP-TE) Extensions", RFC 5151, Standards Track, Network Working Group, Feb. 2008, p. 1-24.

* cited by examiner

NETWORK TUNNELING USING A LABEL STACK DELIMITER

TECHNICAL FIELD

This disclosure relates to computer networks, and more particularly, to tunneling packets through computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The Transmission Control Protocol (TCP) is a common transport-layer protocol by which network devices transport packets according to a packet-switching scheme. In some examples, a circuit-switching scheme or network tunneling scheme, such as Asynchronous Transfer Mode (ATM) over router networks, link emulation using the Internet Protocol (IP) or the Multiprotocol Label Switching (MPLS) protocol, and High-Level Data Link Control (HDLC) over IP or MPLS is more appropriate. In some cases, a client MPLS network utilizes MPLS internally, and also uses a service provider MPLS core to transport MPLS traffic between remote client sites.

SUMMARY

In general, this disclosure describes techniques for tunneling packets through computer networks. In some examples, a customer network is configured to "piggyback" across a tunnel provided by a service provider network. The customer network may also utilize the Multiprotocol Label Switching (MPLS) protocol to traffic engineer paths within and between customer sites. In such examples, the service provider network provides transport services (trunking) to the customer network, such that the service provider network provides an intermediate MPLS network to transport customer MPLS traffic between customer network sites. When the tunnels for the customer network and the service provider network are both established according to MPLS, they have individual label stacks. The MPLS protocol requires that an MPLS label stack have only one label indicative of a bottom of the MPLS label stack, e.g., one label with a bottom-of-stack indicator, such as a bottom-of-stack bit, set.

In accordance with the techniques of this disclosure, an ingress router of an MPLS network providing transport services to another network appends a delimiter label to a received packet when the received packet already has an MPLS label stack and when the received packet is to be tunneled through the MPLS network. The delimiter label is a special purpose label that is not associated with a destination or route, but instead serves as an indicator of a bottom of the label stack for the network providing the transport services, without setting multiple bottom-of-stack indicators. In this manner, routers of the network providing the transport service can use the entire label stack for load balancing purposes, while avoiding interfering with (e.g., overwriting or removing) client-network labels.

In one example, a method includes receiving, by a routing device of a provider network, a packet from a customer network, determining that the packet includes a customer network label and that the packet is to be tunneled through the provider network via a provider network tunnel, based on the determination, adding a delimiter label to the packet indicative of a bottom of a provider network label stack, setting a bottom of stack identifier in the delimiter label to a value that indicates that the delimiter label is not the bottom of a label stack, and adding one or more provider network labels to the packet, and forwarding the packet to a next routing device of the provider network along the provider network tunnel.

In another example, a method includes receiving, by an egress router of a provider network, a packet comprising a provider network label stack, removing the provider network label stack from the packet, determining whether the packet comprises a delimiter label following the provider network label stack, and, when the packet comprises the delimiter label, forwarding the packet to a customer network interface device.

In another example, a routing device of a provider network includes one or more interface cards for receiving and forwarding packets, and a control unit configured to receive a packet from a customer network via the one or more interface cards, determine that the packet includes a customer network label and that the packet is to be tunneled through the provider network via a provider network tunnel, based on the determination, add a delimiter label to the packet indicative of a bottom of a provider network label stack, set a bottom of stack identifier in the delimiter label to a value that indicates that the delimiter label is not the bottom of a label stack, and add one or more provider network labels to the packet; and forward the packet to a next routing device of the provider network along the provider network tunnel via the one or more interface cards.

In another example, a routing device of a provider network includes one or more interface cards for receiving and forwarding packets, and a control unit configured to receive, by the one or more interface cards, a packet comprising a provider network label stack, remove the provider network label stack from the packet, determine whether the packet comprises a delimiter label following the provider network label stack, and, when the packet comprises the delimiter label, forward the packet to a customer network interface device.

In another example, a system includes an ingress routing device of a provider network comprising a control unit configured to receive a packet from a customer network, determine that the packet includes a customer network label and that the packet is to be tunneled through the provider network via a provider network tunnel, based on the determination, add a delimiter label to the packet indicative of a bottom of a first provider network label stack, set a bottom of stack identifier in the delimiter label to a value that indicates that the delimiter label is not the bottom of a label stack, add one or more provider network labels to the packet; and forward the packet to a next routing device of the provider network along the provider network tunnel, and an egress routing device of the provider network comprising a control unit configured to receive the packet comprising a second provider network label stack, remove the second provider network label stack from the packet, determine whether the packet comprises the delimiter label following the provider network label stack, and, when the packet comprises the delimiter label, forward the packet to a customer network interface device.

In another example, a computer-readable storage medium contains, e.g., is encoded with, instructions that cause a processor of a routing device of a provider network to receive a packet from a customer network, determine that the packet includes a customer network label and that the packet is to be tunneled through the provider network via a provider network tunnel, based on the determination, add a delimiter label to the packet indicative of a bottom of a provider network label stack, set a bottom of stack identifier in the delimiter label to a value that indicates that the delimiter label is not the bottom of a label stack, and add one or more provider network labels to the packet, and forward the packet to a next routing device of the provider network along the provider network tunnel.

In another example, a computer-readable storage medium contains, e.g., is encoded with, instructions that cause a processor of a routing device of a provider network to receive a packet comprising a provider network label stack, remove the provider network label stack from the packet, determine whether the packet comprises a delimiter label following the provider network label stack, and when the packet comprises the delimiter label, forwarding the packet to a customer network interface device.

The techniques of this disclosure may provide one or more advantages. For example, the techniques of this disclosure enable routers of a provider network to discriminate between the provider network label stack and the customer network label stack using a delimiter label, e.g., an explicit NULL label. Moreover, the techniques of this disclosure also enable routers of the provider network to utilize labels of the customer network label stack in a read-only mode, e.g., for the purpose of load balancing tunnels through the provider network.

The details of one or more examples are set forth in the accompanying drawings and the description below. Other features, objects, and advantages will be apparent from the description and drawings, and from the claims.

DETAILED DESCRIPTION

Figure 1:
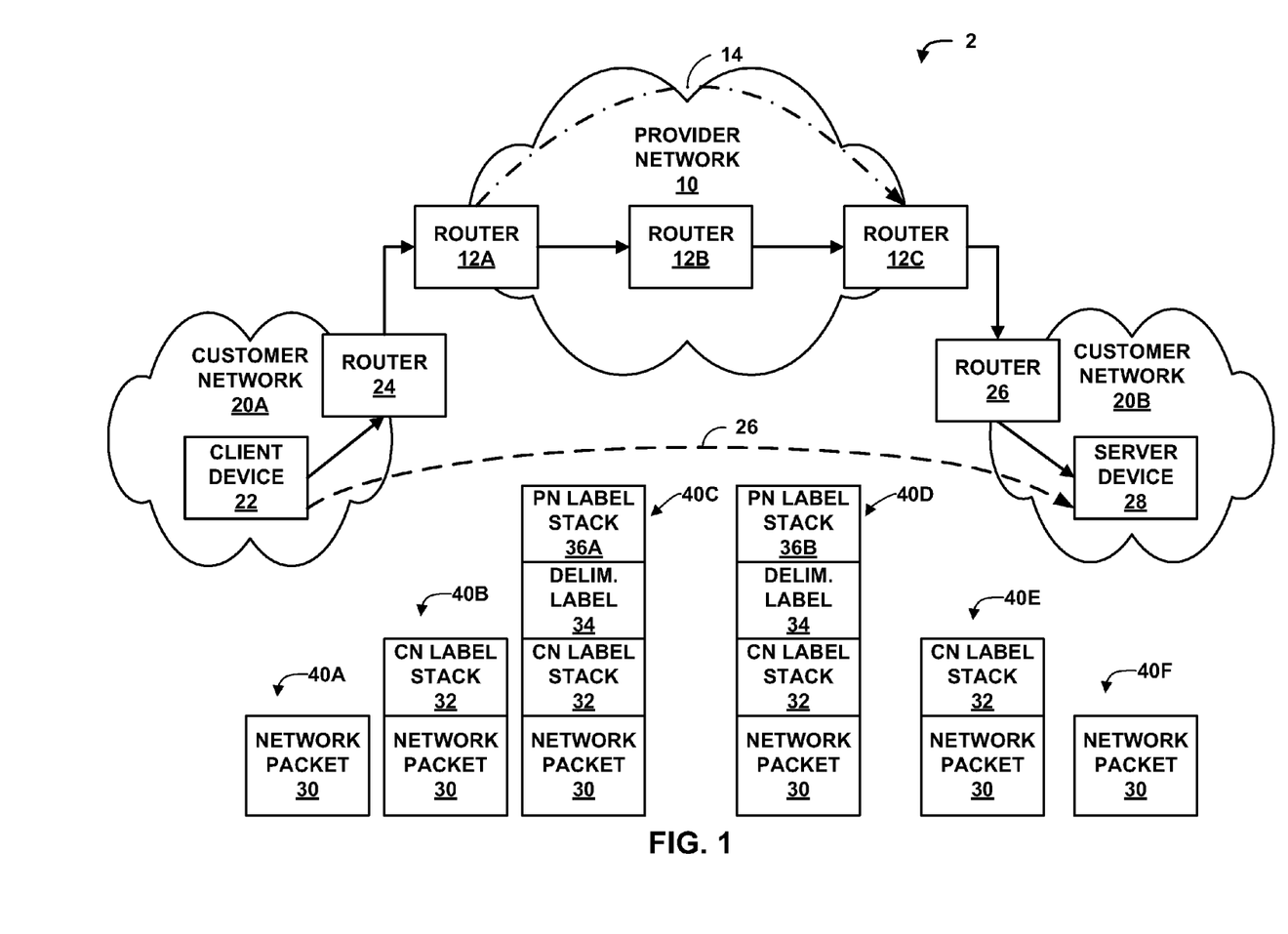
FIG. 1 is a block diagram illustrating an example system in which a provider network provides transport services for a pair of customer network sites.

FIG. 1 is a block diagram illustrating an example system 2 in which a provider network 10 provides transport services for customer network sites 20A, 20B. In general, in the example of FIG. 1, client device 22 establishes a communication session with server device 28. In this example, client device 22 and server device 28 exchange data of the communication session via a network tunnel 26. In this example, customer network sites 20A, 20B establish network tunnel 26. Customer network sites 20A, 20B form a common logical network that is communicatively coupled by provider network 10. Moreover, network tunnel 26, as established by customer network sites 20A, 20B in this example, utilize tunneling services provided by provider network 10 to transport customer network data between customer network sites 20A and 20B. In this manner, provider network 10 provides a pseudowire connection between devices of customer network site 20A and devices of customer network site 20B. Accordingly, provider network 10 provides trunking between customer network sites 20A and 20B.

In the example of FIG. 1, provider network 10 includes routers 12A-12C (routers 12) that route packets through provider network 10. Routers 12 implement various routing protocols for discovering and utilizing routes through provider network 10 and other networks, such as customer network sites 20A, 20B. In accordance with the techniques of this disclosure, routers 12 implement one or more tunneling protocols, such as multiprotocol label switching (MPLS), for establishing tunnel 14 between router 12A and router 12B. In the example of FIG. 1, router 12A is considered an ingress router to tunnel 14, in that router 12A is at the beginning of tunnel 14 and processes inbound packets received from router 24 to form tunneled packets for traversing tunnel 14. Router 12C is considered an egress router to tunnel 14, in that router 12C is at the end of tunnel 14 and processes received, tunneled packets, e.g., by removing labels associated with tunnel 14. Routers 12A and 12C are also considered provider edge (PE) routers, because routers 12A and 12C are positioned at the edge of provider network 10.

Routers 12 execute protocols for establishing paths, such as tunnel 14, through provider network 10, such as, for example, link distribution protocol (LDP) or resource reservation protocol—traffic engineering (RSVP-TE). LDP is described by "LDP Specification," L. Andersson et al., Network Working Group, RFC 5036, October 2007, which is hereby incorporated by reference in its entirety. RSVP-TE is described by "RSVP-TE: Extensions to RSVP for LSP Tunnels," D. Awduche et al., Network Working Group, RFC 3209, December 2001, which is updated by "Inter-Domain MPLS and GMPLS Traffic Engineering—Resource Reservation Protocol-Traffic Engineering (RSVP-TE) Extensions," A. Farrel et al., Network Working Group, RFC 5151, February 2009, which are both hereby incorporated by reference in their respective entireties.

Provider network 10 generally corresponds to an autonomous system maintained by one entity, while customer network sites 20A, 20B generally correspond to sites of a customer network maintained by the customer. In general, provider network 10 provides services, such as tunneling services, to provide a tunneled connection between customer network sites 20A, 20B. For example, the entity managing customer network sites 20A, 20B may request tunneling services from the entity managing provider network 10. In response to this request, the entity configures routers 12 of provider network 10 to perform tunneling for some or all packets received from customer network sites 20A, 20B. The entity managing provider network 10, in some examples, provides configuration data to routers 12 to configure routers 12 to perform tunneling for these packets.

Although only one customer is illustrated in the example of FIG. 1 for ease of illustration, it should be understood that in other examples, additional pairs of customer network sites may use transport services of provider network 10. In some cases, the same pair of provider edge routers may connect two or more pairs of customer edge (CE) devices. For example, router 24 of customer network site 20A and router 26 of customer network site 20B correspond to a pair of CE devices. Furthermore, different customers may request different network layer services to be provided by provider network 10, such as, for example, security services (e.g., intrusion detection, intrusion prevention, malware detection, bot detection, deep packet inspection, and the like), traffic management services, quality of service (QoS) services, or other network layer services.

Accordingly, in addition to labels used to traverse a particular tunnel through provider network 10, routers 12 may append labels to a packet received from a customer network, such as customer network site 20A, indicative of the pair of CE devices to which the packet corresponds and the network layer services to be performed on the packet. This disclosure refers to the path used to connect a pair of CE devices as an interface path. Tunnel 14, in the example of FIG. 1, corresponds to an interface path used to connect routers 24, 26 (which correspond to CE devices, in this example). The label used to identify the pair of CE devices for a packet is also referred to as an interface (IF) label in this disclosure. In this manner, router 12A appends multiple labels to a packet received from, e.g., router 24 of customer network site 20A: a network layer services label (also referred to as an "NL label"), an interface label, and a label used by a next hop along tunnel 14. Collectively, these labels used by provider network 10 to tunnel a packet are referred to as the provider network (PN) label stack. In other words, routers 12A, 12C may be configured to utilize a multi-label stack when transporting customer traffic between routers 24, 26 of customer network 20. For example, router 12A may provide an ingress to an MPLS core provided by provider network 10 by applying an outer label for penultimate forwarding along tunnel 14, an interface label for disambiguating traffic received from customer-facing interface providing connectivity to router 24, and an inner NL label associated with any network layer services to be applied to the customer traffic prior to egressing provider network 10.

Provider network 10 may also be configured to execute certain internal protocols for performing MPLS operation and maintenance (OAM) functions. In general, MPLS OAM functions include defect or failure detection, reporting of detected defects and failures, localization of defects and failures, and performance monitoring related to MPLS tunneling within service provider network 10. At times, a link or a node in a network, such as one of routers 12 or a link connecting two of routers 12, may go offline, and thus, a previously established tunnel may be unusable. Routers 12 internal to service provider network 10 may execute MPLS OAM protocols to detect and report such defects or failures, with respect to MPLS tunnels that traverse the service provider network. Aspects of MPLS OAM techniques are described in H. Ohta, "Assignment of the 'OAM Alert Label' for Multi-protocol Label Switching Architecture (MPLS) Operation and Maintenance (OAM) Functions," Network Working Group, RFC 3429, November 2002, and M. Bocci et al, "MPLS Generic Associated Channel," Network Working Group, RFC 5586, June 2009, which are hereby incorporated by references their respective entireties. In other examples, routers 12 may use additional or alternative techniques for MPLS operations and maintenance or other label switched path (LSP) operations and maintenance.

In the example of MPLS OAM described by RFC 5586, routers along an LSP, such as tunnel 14, utilize a generic alert label (GAL) to identify an MPLS OAM packet that is used as a probe or other test packet to verify the connectivity of the LSP. Forwarding and processing MPLS OAM packets within provider network 10 while also trunking MPLS traffic for customer network 20 may be difficult, without the use of the techniques of this disclosure. For example, router 12A may generate and output an OAM packet that is formed to traverse a specific MPLS LSP, such as tunnel 14. At this time, router 12A may form the OAM packet to include a provider label stack having the GAL label. Because the GAL label is the bottom-most label, router 12A typically sets a bottom of stack bit in the GAL label as an indication that the GAL label is the bottom-most label for the OAM packet. To perform operation and maintenance functions for a particular tunnel, e.g., tunnel 14, router 12A appends labels associated with tunnel 14 to the OAM packet as outer labels on top of the GAL label. For example, router 12A may append an NL label and a outer transport label to the OAM packet, following the GAL label. Router 12A then forwards the OAM packet along tunnel 14.

In this example, router 12C is the last router along tunnel 14. Accordingly, router 12C removes the transport label associated with tunnel 14 from the packet. Router 12C then discovers the NL label, and removes the NL label as well. Moreover, router 12C determines that the NL label is not the bottom of the stack, and thus, router 12C examines the label following the NL label to determine what action to perform for the packet. In this case, router 12C discovers the GAL label of the OAM packet and determines that the packet is an OAM packet. Accordingly, router 12C performs other functions associated with OAM, e.g., issuing a reply to router 12A such that router 12A can determine that devices along tunnel 14 are functioning properly. The label following the NL label in the case of MPLS OAM is a GAL label. On the other hand, when router 12C receives a customer network packet, router 12C discovers a delimiter label, in accordance with the techniques of this disclosure. Therefore, the techniques of this disclosure allow router 12C to safely examine the label following the NL label (that is, following the provider network MPLS label stack), such that router 12C is not at risk of modifying a customer network MPLS label stack, when the packet received by router 12C is a customer network packet having a customer network MPLS label stack.

As discussed above, client device 22 and server device 28 communicate via tunnel 26 formed by customer network sites 20A, 20B, which utilizes transport services provided by provider network 10. Routers of customer network sites 20A, 20B append customer network labels to packets of the communication session between client device 22 and server device 28, e.g., to identify tunnel 26 and other characteristics. Collectively, these labels are referred to as the customer network (CN) label stack. FIG. 1 illustrates an example of a packet 30 (40A) from client device 22 to which routers of customer network site 20A append a CN label stack, e.g., CN label stack 32 (forming packet 40B). Furthermore, because CN label stack 32 is added directly to network packet 30, the bottom of the MPLS stack is the bottom-most label of CN label stack 32, in this example. Therefore, the bottom-most label of CN label stack 32 has a bottom of stack indicator, e.g., a bottom of stack bit, that identifies the bottom-most label as the bottom of the MPLS stack.

Accordingly, when router 12A receives a tunneled packet from router 24 of customer network site 20A, such as packet 40B, the packet has a CN label stack, such as CN label stack 32. In accordance with the techniques of this disclosure, router 12A appends a delimiter label 34 to the packet, as well as one or more additional labels (such as, for example, an NL label, an IF label, and a transport label) to form PN label stack 36A of packet 40C. In some examples, router 12A appends an explicit NULL label, as defined in E. Rosen et al., "MPLS Label Stack Encoding," Network Working Group, RFC 3032, January 2001, and updated by E. Rosen, "Removing a Restriction on the use of MPLS Explicit NULL," Network Working Group, September 2005, the entire contents of each of which are hereby incorporated by reference. That is, in some examples, router 12A appends a label having a label value of "0." Delimiter label 34 has a bottom of stack indicator that indicates that the delimiter label is not the bottom of the stack, because below delimiter label 34, packet 40C includes one or more labels of CN label stack 32, the last of which will be the bottom of the label stack, in this example. In this manner, delimiter label 34 serves to demarcate the separation between a provider network label stack and a customer network label stack.

After appending delimiter label 34 to the packet, router 12A appends one or more labels forming PN label stack 36A, e.g., an NL label, an IF label, and a transport label. In particular, after receiving packet 40B from router 24, router 12A determines that the packet originated from customer network site 20A, e.g., based on an interface and port from which the packet was received. Router 12A also determines that the packet is destined for router 26, thereby determining the pair of CE routers for which provider network 10 acts as an interface. Router 12A uses this information when determining a tunnel (tunnel 14, in this example) by which to transport the packet, as well as any network services to be performed on the packet. Router 12A selects the NL label based on the network services to be performed, the IF label based on the pair of customer edge devices for which provider network 10 provides an interface, and the transport label based on the use of tunnel 14 to transport the packet. Router 12A then appends the selected labels of PN label stack 36A, forming packet 40C, and forwards packet 40C to the next hop along tunnel 14, which is router 12B in this example.

Intermediate routers along tunnel 14 generally swap the top label (the transport label, for example) and replace that label with another, corresponding to a next hop along tunnel 14. Accordingly, intermediate routers along a tunnel may be referred to as label switch routers (LSRs). Routers at the edge (e.g., ingress and egress) of tunnel 14, on the other hand, may be referred to as label edge routers (LERs). LSRs, such as router 12B, generally do not modify the NL label and the IF label in the PN label stack. However, when the transport label is swapped, PN label stack 36A is modified to form PN label stack 36B of packet 40D. Router 12B forwards packet 40D to router 12C, the next hop along tunnel 14.

In this example, router 12C is the egress of tunnel 14. Therefore, router 12C is responsible for removing labels associated with tunnel 14. Rather than removing all labels of packet 40D, however, router 12C is configured to remove labels up to and including delimiter label 34. Router 12C then forwards packet 40E, having only the original network packet 30 and CN label stack 32, to router 26. Router 26, in turn, forwards packet 40F (after removing CN label stack 32, in this example) to server device 28. In general, tunnel 26 may include additional routers of customer network sites 20A, 20B.

Because router 12A appends delimiter label 34 to a packet received from customer network site 20A that is to be tunneled and that already has an existing label stack, router 12C is able to distinguish the packet from, e.g., an OAM packet. That is, router 12C is able to safely examine the label following the NL label in the provider network MPLS label stack, regardless of whether the packet is an MPLS OAM packet or a customer network packet having a customer network MPLS label stack. In either case, the label following the provider network label stack will have been added by the provider network, and thus, be safe to examine and remove by router 12C. Although the bottom-most label of the provider network label stack does not have the bottom of stack bit set to indicate that the label is the bottom of the provider network label stack, router 12C is nevertheless able to determine the bottom of the provider network label stack, using the delimiter label. Accordingly, router 12C can be safely configured to remove all labels of the provider network label stack, as well as the delimiter label, without concern of interference with the customer network label stack. Moreover, use of delimiter label 34 allows routers along tunnel 14 to analyze the full MPLS label stack, including customer network label stack 32, when making determinations regarding load balancing, in some examples.

In some examples, routers 12 utilize the full MPLS label stack of packets tunneled through provider network 10 to perform load balancing. In accordance with the techniques of this disclosure, the MPLS label stack may include a customer network label stack, in addition to a provider network label stack. The use of entropy labels to perform load balancing is described in Drake et al., "The Use of Entropy Labels in MPLS Forwarding," draft-ietf-mpls-entropy-label-00, Network Working Group, Internet Draft, May 5, 2011, available at http://datatracker.ietf.org/doc/draft-ietf-mpls-entropy-label/, which is hereby incorporated by reference in its entirety. In general, labels in the MPLS label stack for the packets may be treated as keys as input to a load balancing function (which may be a hash function) that selects the path for all packets associated with a particular flow. Thus, rather than performing deep packet inspection on the packets, which would typically examine data in addition to the MPLS label stack, routers 12 may simply use the labels of the MPLS label stack as the keys used to load balance packets of various packet flows across tunnels of network 10.

The techniques performed by routers 12 of provider network 10 may provide one or more advantages. For example, routers 12 of provider network 10 may use the delimiter label to discriminate between the provider network label stack and the customer network label stack. Moreover, routers 12 of the provider network may utilize labels of the customer network label stack in a read-only mode, e.g., for the purpose of load balancing tunnels through provider network 10. Therefore, routers 12 may utilize packets having a label stack including a customer network label stack and a provider network label stack, which both conform to the standard requirements of MPLS and provide an indication of the separation between the customer network label stack and the provider network label stack.

Figure 2:
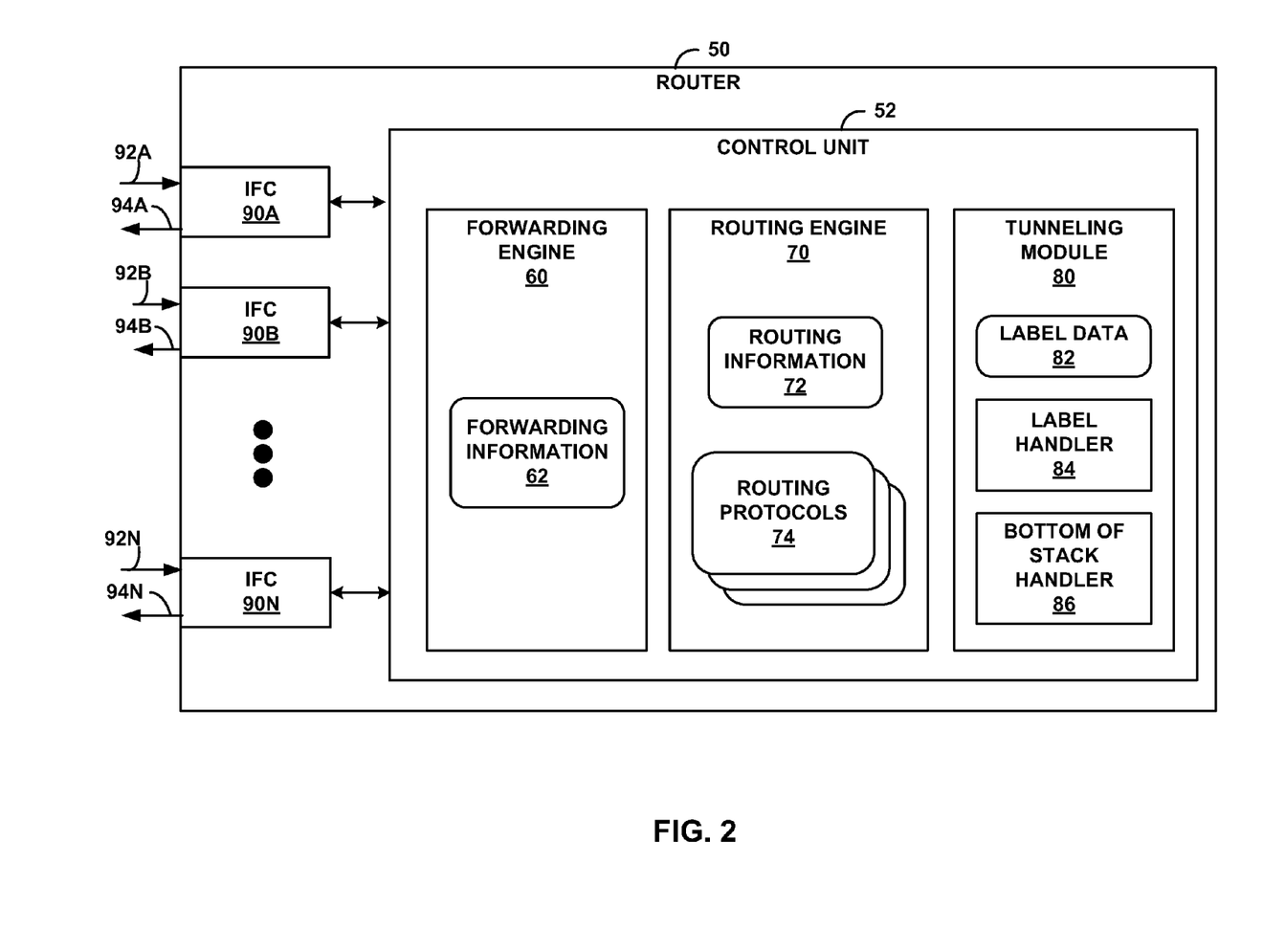
FIG. 2 is a block diagram illustrating an example router including a tunneling module configured according to the techniques of this disclosure.

FIG. 2 is a block diagram illustrating an example router 50 including a tunneling module 80 configured according to the techniques of this disclosure. Router 50 may correspond to a label edge router, e.g., one of routers 12A or 12C in FIG. 1. In the example of FIG. 2, router 50 includes interface cards 90A-90N (IFCs 90), and control unit 52. Control unit 52 includes forwarding engine (PFE) 60, routing engine (RE) 40, and tunneling module 80.

IFCs 90 receive data via respective inbound links 92A-92N (inbound links 92) and send data via outbound links 94A-94N (outbound links 94). Inbound links 92 and outbound links 94 in some examples form common, physical communication media for the IFCs, which operate in full duplex mode. That is, in some examples, each of IFCs 90 are coupled to respective communication media that can send and receive data substantially simultaneously. In other examples, inbound links 92 and outbound links 94 form separate physical media for respective IFCs 90.

Control unit 52 includes processing hardware and, in some examples, software and/or firmware executed by the processing hardware. In various examples, control unit 52 and the various elements thereof, e.g., PFE 60 and RE 70, are implemented in one or more processors, processing units, digital signal processors (DSPs), application specific integrated circuits (ASICs), field programmable gate arrays (FPGAs), or any combination thereof. When implemented in software or firmware, control unit 52 includes one or more processors or processing units for executing instructions for the software or firmware, as well as a computer-readable storage medium for storing the instructions. In some examples, elements of PFE 60 and RE 70 are implemented in discrete units or modules, while in other examples, PFE 60 and RE 70 are functionally integrated.

RE 70 includes instructions for one or more routing protocols 74. Routing protocols 74 include any or all of interior gateway routing protocols such as open shortest path first (OSPF), intermediate system to intermediate system (IS-IS), routing information protocol (RIP), interior gateway routing protocol (IGRP), enhanced IGRP (EIGRP), and/or exterior gateway routing protocols, such as border gateway protocol (BGP). In general, interior gateway routing protocols are used to exchange routing information between routers of an autonomous system. When network 10 (FIG. 1) forms an autonomous system, routers 12 exchange routing information according to an interior gateway routing protocol. Routers at the edge of an autonomous system, such as routers 12A and 12E (FIG. 1) exchange routing information with routers of other autonomous systems (not shown) in accordance with exterior gateway routing protocols. Routing protocols 74 further include protocols related to network tunneling, such as MPLS, label distribution protocol (LDP), resource reservation protocol traffic engineering (RSVP-TE), or other protocols.

In general, RE 70 executes routing protocols 74 to determine routes between network devices, e.g., routes from router 50 to other network devices. Other routers coupled to router 50 via IFCs 90 advertise routes to router 50. When router 50 receives a communication from another router that advertises a new route, RE 70 receives the communication and stores the new route in routing information 42 (also referred to as a routing information base). RE 70 also executes routing protocols 74 to prioritize routes from router 50 to a destination. That is, when routing information 42 includes information indicating that multiple routes exist to a common destination, RE 70 executes routing protocols 74 to select one of the routes to reach the destination.

The selected route to reach the destination generally includes an indication of a "next hop" along the route to reach the destination. This next hop typically corresponds to a network device, such as, for example, another router, switch, gateway, or other network device along the route to reach the destination. The next hop device is connected to router 50 via one of IFCs 90. Accordingly, using the selected route to reach a destination, control unit 52 can determine the one of IFCs 90 connected to the next hop along the route to the destination and update forwarding information stored by PFE 60 to indicate the one of IFCs 90 to which to send packets destined for the destination.

More specifically, PFE 60 maintains forwarding information base (FIB) 62. Then, in response to receiving information from routing engine 40, PFE 60 updates FIB 62 to map a destination address to one of IFCs 90, based on the next hop along the route to reach the destination address. FIB 62 also includes information indicating how to forward packets associated with a network tunnel, e.g., packets having one or more labels and/or packets to which to append one or more labels.

When router 50 acts as an ingress router for a tunnel, router 50 receives a packet from a customer network having a customer network label stack via one of ingress links 92 for one of IFCs 90. In general, IFCs 90 are configured to send such a packet to forwarding engine 60. Forwarding engine 60 determines the source device from which the packet was received based on the one of IFCs 90 that received the packet and the port of the one of IFCs 90 that received the packet. In some examples, forwarding engine 60 also determines the destination of the packet. In any case, forwarding engine 60 determines, using forwarding information 62, that the packet is to be tunneled, and therefore sends the packet to tunneling module 80. It should be understood that router 50 may also be configured to receive and process conventional network packets, e.g., packets not associated with a tunnel and/or packets to be tunneled that do not have a customer network label stack. However, in general, the techniques of this disclosure are directed to appending a delimiter label to a packet to be tunneled having an existing customer network label stack, and therefore, processes applied to other received packets are not described at length.

Tunneling module 80 includes label data 82, label handler 84, and bottom of stack handler 86. Label data 82 represents data for labels that can be appended to a received packet, as well as data for handling a packet having labels already appended. For example, when router 50 acts as an ingress router for a tunnel, label handler 84 receives the packet and determines a tunnel to which the packet is to be sent. Label handler 84 also determines, based on information received for the packet, a pair of customer edge routers for the packet and network layer services to be applied to the packet. Label handler 84 then determines, using label data 82, labels representing the pair of customer edge routers, the network layer services, and a label for the tunnel representative of the next hop along the tunnel. Bottom of stack handler 86 appends a delimiter label to the packet, without setting a bottom of stack indicator that indicates that the delimiter label is the bottom of the MPLS stack. That is, the value of the bottom of stack indicator (e.g., a bottom of stack bit or flag) indicates that the delimiter label is not the bottom of the MPLS stack. This is based on the determination that the received packet included a customer network label stack, which included a label having an indication that that label is the bottom of the MPLS stack. Label handler 84 also appends labels following the delimiter label to the packet, e.g., a network layer services label, an interface label, and a transport label.

On the other hand, when router 50 represents an egress router for the tunnel, tunneling module 80 removes labels from a received, tunneled packet, e.g., the transport label, the interface label, and the network layer services label. Tunneling module 80 is configured with the expectation that the data following the network layer services label is another label, e.g., a delimiter label or a generic access label. Therefore, after removing the network layer services label, tunneling module 80 determines a label value for the next label.

Tunneling module 80 determines that the label following the network services label is a GAL label when the label value is 14, in some examples, as described by RFC 3429. Accordingly, tunneling module 80 (or another element of router 50) determines that the data following the GAL label is an MPLS OAM packet, and responds according to the MPLS OAM protocol, e.g., as described by RFC 5586. On the other hand, when the label value is 0 (or another value indicative of a delimiter label), tunneling module 80 determines that this label is a delimiter label that can be removed, and then sends the packet to forwarding engine 60 for forwarding to the appropriate customer edge device. In some examples, tunneling module 80 sends an indication of the customer edge device to forwarding engine 60, based on a value of the interface label.

Figure 3A:
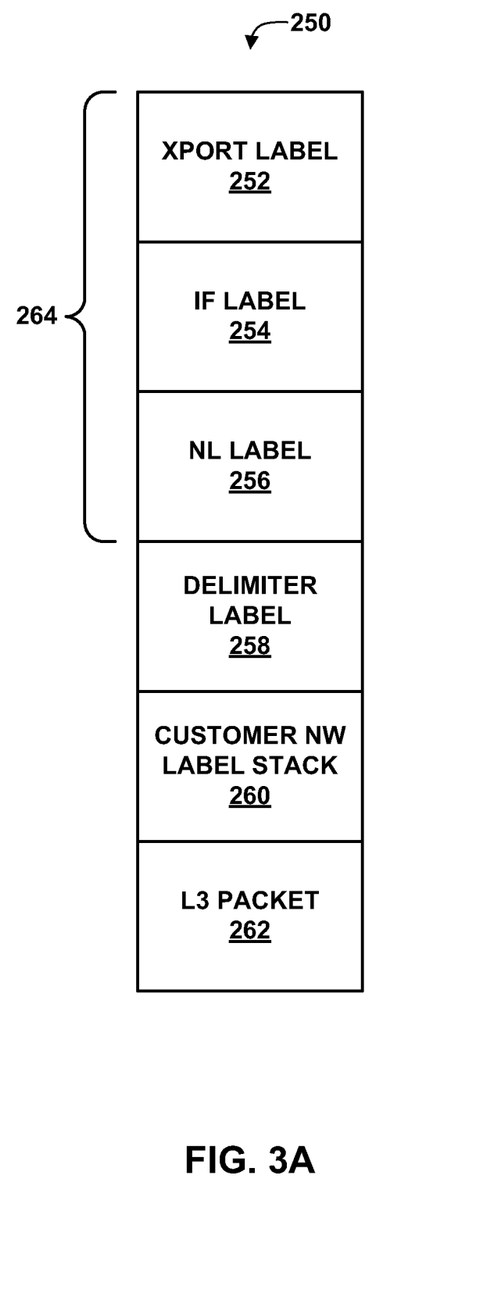
FIGS. 3A and 3B are conceptual diagrams illustrating examples of a multiprotocol label switching (MPLS) packet and an MPLS operations and maintenance (OAM) packet.
Figure 3B:
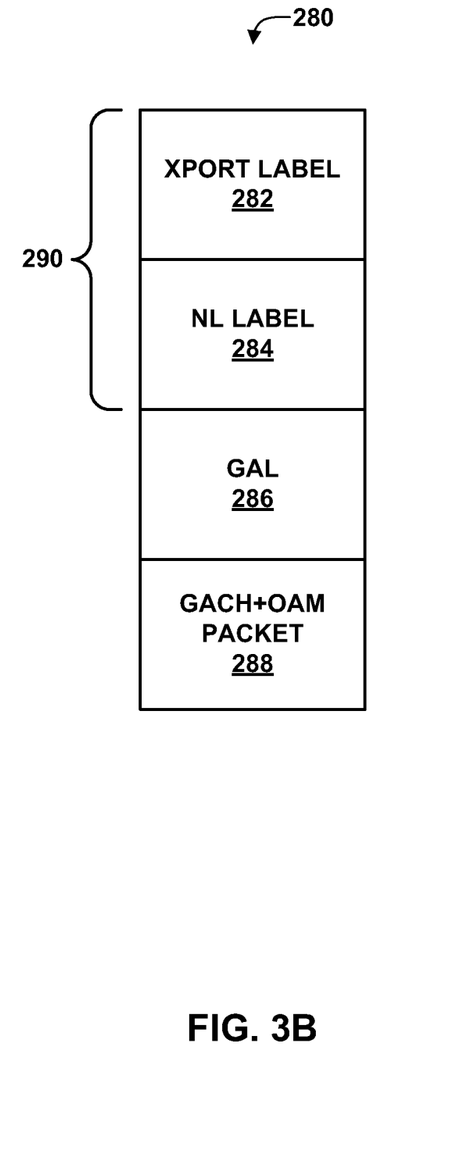

FIGS. 3A and 3B are conceptual diagrams illustrating examples of an MPLS packet 250 and an MPLS OAM packet 280. FIG. 3A illustrates MPLS packet 250 having a provider network label stack 264, a customer network label stack 260, a delimiter label 258 that separates provider network label stack 264 from customer network label stack 260, and a layer three (network layer) packet 262. RFC 3032 requires that the bottom of stack bit (an example of an indicator of a bottom of stack for a label) is set to one for the last entry in the label stack, and zero for all other label stack entries. Accordingly, the last label in customer network label stack 260 has a bottom of stack indicator that indicates that the last label is the bottom of the MPLS label stack for packet 250. The other labels have bottom of stack indicators that indicate that those labels are not the bottom of the MPLS label stack.

In this example, provider network label stack 264 includes transport (Xport) label 252, interface (IF) label 254, and network layer services (NL) label 256. In accordance with the techniques of this disclosure, packet 250 includes a delimiter label that separates provider network label stack 264 from customer network label stack 260. Delimiter label 258 includes a label value that is not associated with a network tunnel. In some examples, delimiter label 258 corresponds to the explicit NULL label of RFC 3032, e.g., having a label value of zero (0).

FIG. 3B illustrates an example of an MPLS OAM packet 280. In this example, packet 280 includes a provider network label stack 290 similar to provider network label stack 264 of packet 250. In particular, in this example, provider network label stack 290 includes transport label 282 and network layer services label 284. Following these labels, packet 280 includes generic access label (GAL) 286, and then a generic access channel (GACH) and OAM packet 288. In this manner, packet 280 can be used to perform operation and maintenance processes for a network tunnel, e.g., tunnel 14 (FIG. 1).

Because an MPLS OAM packet, such as packet 280, can traverse a network tunnel of a provider network, egress routers of the provider network must be configured to determine the value of the label following the network layer services label, e.g., NL label 284. Because packets having customer data, such as packet 250, include a delimiter label (e.g., delimiter label 258) added by the tunnel ingress router of the provider network (e.g., router 12A of provider network 10), the egress router (e.g., router 12C of provider network 10) can safely analyze the value of the label following the network layer services label, without the risk of modifying customer network data (e.g., customer network labels). Moreover, because packet 250 includes only one label with a bottom of stack bit set (e.g., the bottom-most label of customer network label stack 260), packet 250 conforms to the requirements of the MPLS standards. Furthermore, routers along a network tunnel for packet 250 can analyze all labels of provider network label stack 264 and customer network label stack 260, e.g., for purposes of load balancing, while maintaining a distinct separation between provider network label stack 264 and customer network label stack 260.

Figure 4:
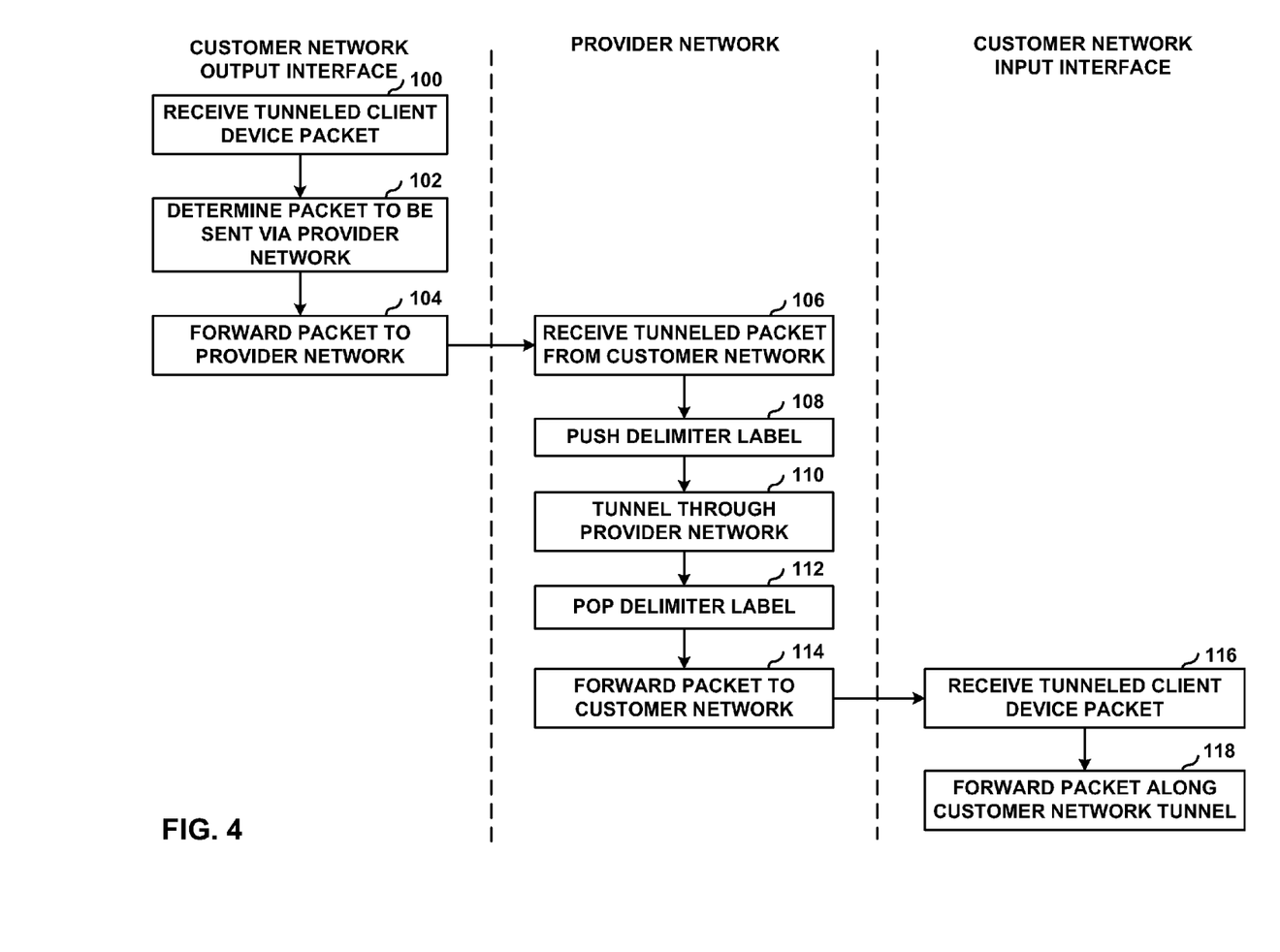
FIG. 4 is a flowchart illustrating an example method for using delimiter labels by a provider network.

FIG. 4 is a flowchart illustrating an example method for using delimiter labels by a provider network. In the example of FIG. 4, a customer network output interface, e.g., router 24, receives a tunneled client device packet (100). For example, router 24 receives a tunneled packet from client device 22 or an intermediate device between client 22 and router 24, e.g., another router. The term "output interface" is intended to represent a network device, e.g., a router, that sends a packet having a customer network MPLS label stack to a provider network. In the example of FIG. 4, the output interface device determines that the packet is to be sent via a provider network, such as provider network 10 (102). Accordingly, the output interface device forwards the packet to the provider network (104).

An ingress router of the provider network, e.g., router 12A, receives the packet having the customer network MPLS label stack (that is, a tunneled packet) from the customer network (106). Because the packet has an existing customer network label stack, the ingress router pushes a delimiter label (108), to demarcate the separation between the customer network MPLS label stack and the forthcoming provider network MPLS label stack. Routers of the provider network then tunnels the packet through the provider network (110), e.g., by appending or swapping labels for the provider network to the packet and forwarding the packet in accordance with the labels.

Ultimately, one or more routers of the provider network remove the provider network label stack, as well as the delimiter label (112). The egress router of the provider network then forwards the packet to the input interface device of the customer network, e.g., router 26 of FIG. 1 (114). The input interface device receives the tunneled client device packet, that is, the packet having an existing customer network label stack (unmodified by provider network) from the egress router of the provider network (116), and forwards the packet along the customer network tunnel toward its ultimate destination (118).

Figure 5:
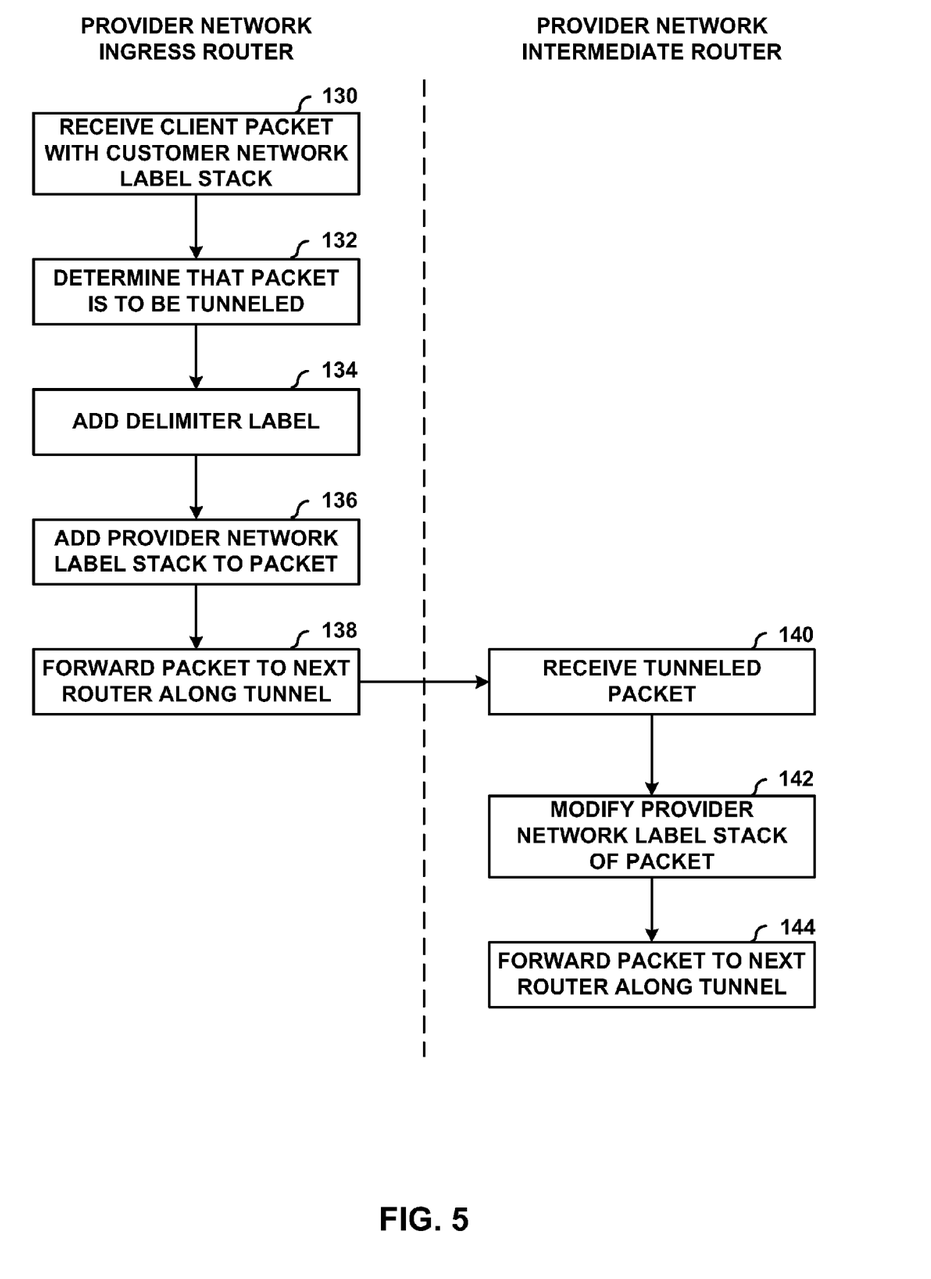
FIG. 5 is a flowchart illustrating an example method by which a provider network ingress router appends one or more labels to a packet having an existing customer network label stack.

FIG. 5 is a flowchart illustrating an example method by which a provider network ingress router appends one or more labels to a packet having an existing customer network label stack. Initially, a provider network ingress router (e.g., router 12A) receives a client packet having a customer network label stack (130). Using stored forwarding information, the ingress router determines that the packet is to be tunneled through the provider network (132). For example, the ingress router determines the interface card that received the packet, as well as the port on which the interface card received the packet, and in some cases, the destination of the packet. Based on the determinations that the packet is to be tunneled, and that the packet includes an existing customer network label stack, the ingress router adds a delimiter label to the packet (134), in accordance with the techniques of this disclosure. The ingress router also adds a provider network label stack to the packet (136). The ingress router then forwards the packet to the next router (the next hop) along the tunnel (138).

An intermediate router of the provider network receives the tunneled packet (140). Accordingly, the intermediate router modifies the provider network label stack of the packet (142). In some examples, the intermediate router determines a value for the transport label, and a next hop associated with that value, and swaps the transport label with a new transport label. The intermediate router then forwards the packet to the determined next hop along the tunnel (144). Similarly, other intermediate routers along the tunnel swap the transport label for a new transport label, and forward the packet to the next router along the tunnel.

Figure 6:
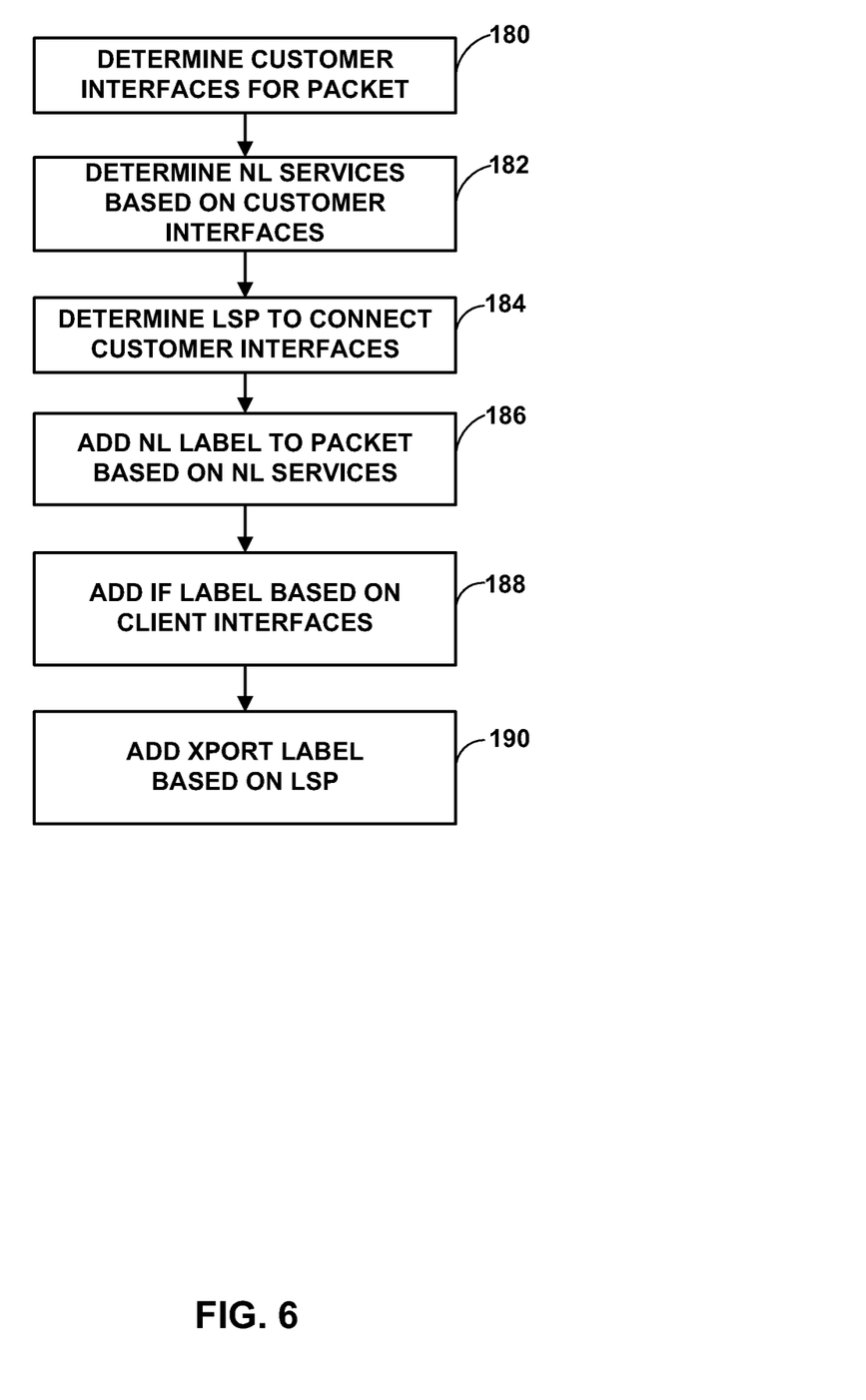
FIG. 6 is a flowchart illustrating an example method for adding a provider network label stack to a packet to be tunneled.

FIG. 6 is a flowchart illustrating an example method for adding a provider network label stack to a packet to be tunneled. The method of FIG. 6 is generally performed by an ingress router of a provider network, such as router 12A in the example of FIG. 1, and generally corresponds to step 136 of FIG. 5. Initially, the ingress router determines a pair of customer interfaces for a received packet (180). As discussed above, this determination may be based on the port and interface card of the ingress router that received the packet, as well as on the destination for the packet. The ingress router also determines network layer services to be performed on the packet, based on the customer interfaces (182). Furthermore, the ingress router determines a tunnel (e.g., a label switched path (LSP)) to use to connect the customer interfaces (184). In some examples, there may be more than one tunnel through the provider network that can connect two customer interfaces. The ingress router selects one of the tunnels, in some examples, based on load balancing techniques.

After making the determinations above, the ingress router adds a network layer services (NL) router to the packet, based on the network layer services to be performed (186). The ingress router also adds an interface (IF) label to the packet based on the client interfaces corresponding to the packet (188). Further, the ingress router adds a transport (Xport) label based on the tunnel (e.g., LSP) along which the packet is to be forwarded through the provider network (190).

Figure 7:
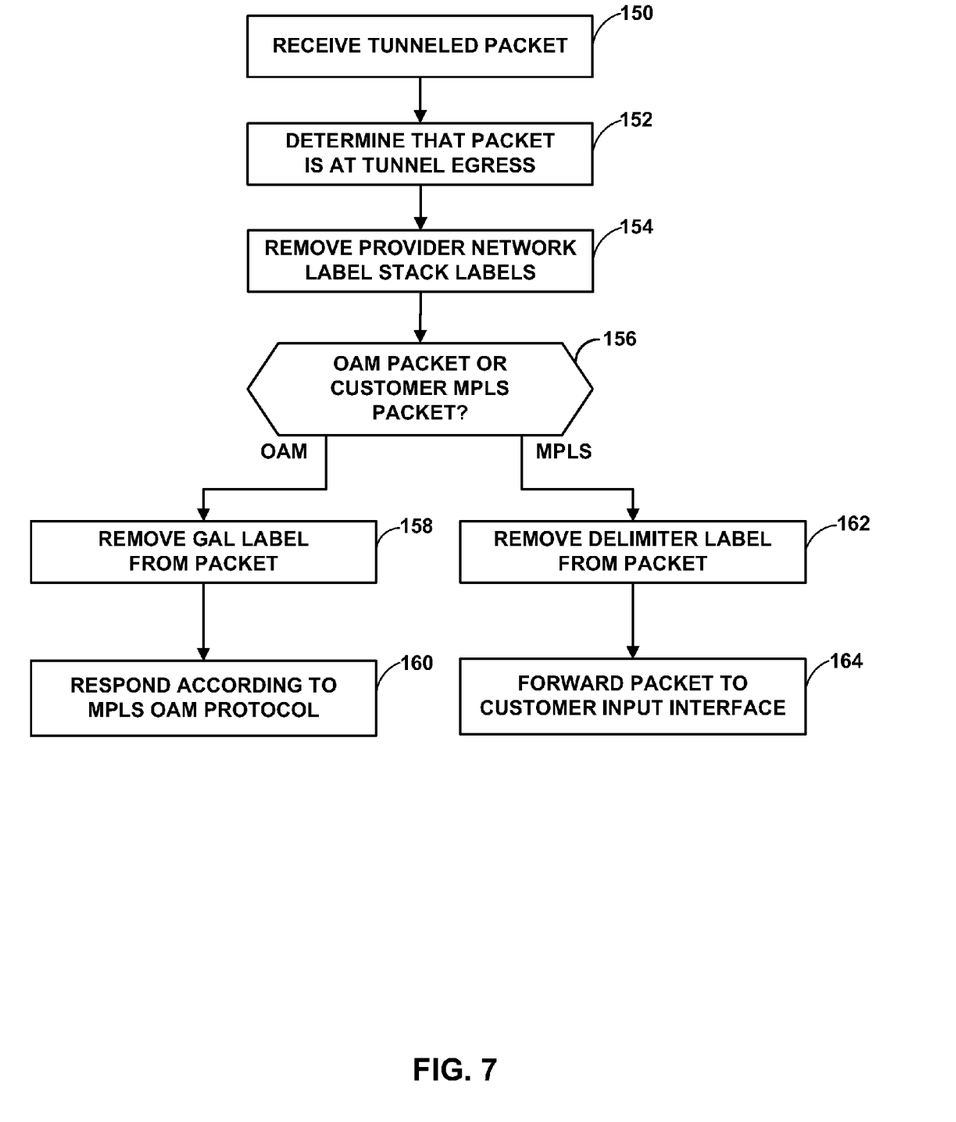
FIG. 7 is a flowchart illustrating an example method performed by an egress router of a provider network in accordance with the techniques of this disclosure.

FIG. 7 is a flowchart illustrating an example method performed by an egress router of a provider network in accordance with the techniques of this disclosure. Initially, an egress router of a provider network, such as router 12C of the example of FIG. 1, receives a packet that was tunneled through the provider network (150). In some examples, the egress router (the ultimate router for the tunnel) is responsible for removing all labels associated with the tunnel, while in other examples, the penultimate router is responsible for removing certain labels associated with the tunnel, e.g., the transport label.

In any case, based on the presence of a provider network label stack, which may include a network layer label, an interface label, and/or a transport label, the egress router determines that the packet is at the tunnel egress, e.g., based on forwarding information stored by the egress router (152). Accordingly, the egress router removes the provider network label stack labels, which includes a network layer services label and possibly an interface label and/or a transport label (154). In accordance with the techniques of this disclosure, the data following the network label stack will be a GAL label, a delimiter label, or a L3 IP packet (e.g., when the customer packet was not tunneled through a customer tunnel). The techniques of this disclosure are directed to a customer network packet that includes a customer network label stack upon receipt by an ingress router, however, and therefore the case of a L3 IP packet is not considered further in this example.

In light of the techniques of this disclosure, the egress router can safely analyze the label following the network layer services label of the packet, which will be either a GAL label or a delimiter label (e.g., an explicit NULL label). Using the label value of the label following the NL label, the egress router determines whether the packet is an OAM packet or a customer MPLS packet (156). If the label value indicates that the packet is an OAM packet, e.g., the label has a label value of 14, then the egress router removes the GAL label from the packet (158), and proceeds to respond according to the MPLS OAM protocol (160). On the other hand, if the label value indicates that the packet is a customer MPLS packet, e.g., if the label has a label value of 0 (indicating that the label is an explicit NULL label), the egress router removes the delimiter label from the packet (162) and forwards the packet to the appropriate customer input interface (164). The egress router determines the customer input interface based on the interface (IF) label of the packet. In this manner, the example of FIG. 7 demonstrates how an egress router can use the delimiter label to distinguish a customer MPLS packet, that is, a packet having a customer network MPLS stack, from an MPLS OEM packet generated internally within the provider network of the egress router.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
   receiving, by a routing device of a provider network, a packet from a customer network;
   determining that the packet includes a customer multiprotocol label switching (MPLS) label stack including a customer network label and that the packet is to be tunneled through the provider network via a provider network tunnel;
   based on the determination that the packet includes the customer MPLS label stack including the customer network label, adding a delimiter label to the packet indicative of a bottom of a provider network label stack, setting a bottom of stack identifier in the delimiter label to a value that indicates that the delimiter label is not the bottom of a label stack, and adding one or more provider network labels to the packet, wherein after adding the delimiter label and the one or more provider network labels to the packet, a label stack for the packet comprises the one or more provider network labels, the delimiter label following the provider network labels, and the customer network label following the delimiter label;
analyzing the label stack for the packet;
performing load balancing on a plurality of provider network tunnels, including the provider network tunnel, based at least in part on the analysis of the label stack for the packet; and
after performing the load balancing, forwarding the packet to a next routing device of the provider network along the provider network tunnel.

2. The method of claim 1, wherein adding the delimiter label comprises adding an explicit null label to the packet.

3. The method of claim 1,
wherein the customer network label comprises a bottom of stack identifier having a value that indicates that the customer network label is a bottom of a label stack for the packet, and
wherein after adding the delimiter label and the one or more provider network labels to the packet, the label stack for the packet comprises the one or more provider network labels, the delimiter label following the provider network labels, and the customer network label following the delimiter label and including the bottom of stack identifier for the entire label stack.

4. The method of claim 1, further comprising, prior to receiving the packet, receiving configuration data indicating that packets received from the customer network are to be forwarded via the provider network tunnel.

5. A method comprising:
receiving, by an ingress routing device of a provider network, a packet from a customer network;
determining that the packet includes a customer multiprotocol label switching (MPLS) label stack including a customer network label and that the packet is to be tunneled through the provider network via a provider network tunnel;
based on the determination that the packet includes the customer MPLS label stack including the customer network label, adding a delimiter label to the packet indicative of a bottom of a provider network label stack, setting a bottom of stack identifier in the delimiter label to a value that indicates that the delimiter label is not the bottom of a label stack, adding one or more provider network labels to the packet;
forwarding the packet to a next routing device of the provider network along the provider network tunnel;
forming, by the ingress routing device, an operations and maintenance (OAM) packet;
adding a generic alert label (GAL) to the OAM packet, wherein the GAL includes an indication that the GAL is a bottom of a provider network label stack for the OAM packet;
adding the one or more provider network labels to the OAM packet, such that the OAM packet comprises the same provider network label stack following the GAL as the packet received from the customer network; and
forwarding the OAM packet to the next routing device of the provider network along the provider network tunnel, such that the OAM packet is tunneled through the same provider network tunnel as the packet received from the customer network.

6. A method comprising:
receiving, by an egress router of a provider network, a packet comprising a provider network label stack;
removing the provider network label stack from the packet;
determining whether the packet comprises a delimiter label or a generic alert label (GAL) following the provider network label stack;
determining that the packet comprises an operations and maintenance (OAM) packet when the packet comprises the GAL following the provider network label stack, rather than the delimiter label, and
based on the determination that the packet comprises the OAM packet, responding to the packet in accordance with multiprotocol label stacking (MPLS) OAM protocol.

7. The method of claim 5, further comprising:
when the packet comprises the delimiter label, forwarding the packet to a customer network interface device without removing a customer network label stack from the packet.

8. A routing device of a provider network, the routing device comprising:
one or more interface cards for receiving and forwarding packets; and
a control unit configured to receive a packet from a customer network via the one or more interface cards, determine that the packet includes a customer multiprotocol label switching (MPLS) label stack including a customer network label and that the packet is to be tunneled through the provider network via a provider network tunnel, based on the determination that the packet includes the customer MPLS label stack including the customer network label, add a delimiter label to the packet indicative of a bottom of a provider network label stack, set a bottom of stack identifier in the delimiter label to a value that indicates that the delimiter label is not the bottom of a label stack, and one or more provider network labels to the packet, wherein after adding the delimiter label and the one or more provider network labels to the packet, a label stack for the packet comprises the one or more provider network labels, the delimiter label following the provider network labels, and the customer network label following the delimiter label, wherein the control unit is configured to analyze the label stack for the packet, perform load balancing on a plurality of provider network tunnels, including the provider network tunnel, based at least in part on the analysis of the label stack for the packet, and, after performing the load balancing, forward the packet to a next routing device of the provider network along the provider network tunnel via the one or more interface cards.

9. The routing device of claim 7, wherein the delimiter label comprises an explicit null label.

10. The routing device of claim 7, wherein the customer network label comprises a bottom of stack identifier having a value that indicates that the customer network label is a bottom of a label stack for the packet, such that after adding the delimiter label and the one or more provider network labels to the packet, the label stack for the packet comprises the one or more provider network labels, the delimiter label following the provider network labels, and the customer network label following the delimiter label and including the bottom of stack identifier for the entire label stack.

11. The routing device of claim 7, wherein the control unit is configured to, prior to receiving the packet, receive configuration data indicating that packets received from the customer network are to be forwarded via the provider network tunnel.

12. An ingress routing device of a provider network, the ingress routing device comprising:
one or more interface cards for receiving and forwarding packets; and
a control unit configured to receive a packet from a customer network via the one or more interface cards, determine that the packet includes a customer multiprotocol label switching (MPLS) label stack including a customer network label and that the packet is to be tunneled through the provider network via a provider network tunnel, based on the determination that the packet includes the customer MPLS label stack including the customer network label, add a delimiter label to the packet indicative of a bottom of a provider network label stack, set a bottom of stack identifier in the delimiter label to a value that indicates that the delimiter label is not the bottom of a label stack, and one or more provider network labels to the packet, forward the packet to a next routing device of the provider network along the provider network tunnel via the one or more interface cards, form an operations and maintenance (OAM) packet, add a generic alert label (GAL) to the OAM packet, wherein the GAL includes an indication that the GAL is a bottom of a provider network label stack for the OAM packet, add the one or more provider network labels to the OAM packet such that the OAM packet comprises the same provider network label stack following the GAL as the packet received from the customer network, and forward the OAM packet to the next routing device of the provider network along the provider network tunnel such that the OAM packet is tunneled through the same provider network tunnel as the packet received from the customer network.

13. A routing device of a provider network, the routing device comprising:
one or more interface cards for receiving and forwarding packets; and
a control unit configured to receive, by the one or more interface cards, a packet comprising a provider network label stack, remove the provider network label stack from the packet, determine whether the packet comprises a delimiter label or a generic alert label (GAL) following the provider network label stack, determine that the packet comprises a customer network label stack when the packet comprises the delimiter label, determine that the packet comprises an operations and maintenance (OAM) packet when the packet comprises the GAL following the provider network label stack, rather than the delimiter label, when the packet comprises the OAM packet, respond to the packet in accordance with multiprotocol label stacking (MPLS) OAM protocol, and, when the packet comprises the delimiter label, forward the packet to a customer network interface device without removing the customer network label stack from the packet.

14. A system comprising:
an ingress routing device of a provider network comprising a control unit configured to receive a packet from a customer network, determine that the packet includes a customer network label and that the packet is to be tunneled through the provider network via a provider network tunnel, based on the determination, add a delimiter label to the packet indicative of a bottom of a first provider network label stack, set a bottom of stack identifier in the delimiter label to a value that indicates that the delimiter label is not the bottom of a label stack, add one or more provider network labels to the packet wherein after adding the delimiter label and the one or more provider network labels to the packet, a label stack for the packet comprises the one or more provider network labels, the delimiter label following the provider network labels, and the customer network label following the delimiter label, wherein the control unit is configured to analyze the label stack for the packet, perform load balancing on a plurality of provider network tunnels, including the provider network tunnel, based at least in part on the analysis of the label stack for the packet, and, after performing the load balancing, forward the packet to a next routing device of the provider network along the provider network tunnel; and
an egress routing device of the provider network comprising a control unit configured to receive the packet comprising a second provider network label stack, remove the second provider network label stack from the packet, determine whether the packet comprises the delimiter label following the provider network label stack, and, when the packet comprises the delimiter label, forward the packet to a customer network interface device.

15. A non-transitory computer-readable storage medium comprising instructions that, when executed, cause a processor of a routing device of a provider network to:
receive a packet from a customer network;
determine that the packet includes a customer multiprotocol label switching (MPLS) label stack including a customer network label and that the packet is to be tunneled through the provider network via a provider network tunnel;
based on the determination that the packet includes the customer MPLS label stack including the customer network label, add a delimiter label to the packet indicative of a bottom of a provider network label stack, set a bottom of stack identifier in the delimiter label to a value that indicates that the delimiter label is not the bottom of a label stack, and add one or more provider network labels to the packet, wherein after adding the delimiter label and the one or more provider network labels to the packet, a label stack for the packet comprises the one or more provider network labels, the delimiter label following the provider network labels, and the customer network label following the delimiter label;
analyze the label stack for the packet;
perform load balancing on a plurality of provider network tunnels, including the provider network tunnel, based at least in part on the analysis of the label stack for the packet; and
after performing the load balancing, forward the packet to a next routing device of the provider network along the provider network tunnel.

16. A non-transitory computer-readable storage medium comprising instructions that, when executed, cause a processor of a routing device of a provider network to:
receive a packet comprising a provider network label stack;
remove the provider network label stack from the packet;
determine whether the packet comprises a delimiter label or a generic alert label (GAL) following the provider network label stack;
determining that the packet comprises a customer network label stack when the packet comprises the delimiter label;
determine that the packet comprises an operations and maintenance (OAM) packet when the packet comprises the GAL following the provider network label stack, rather than the delimiter label;

when the packet comprises the OAM packet, respond to the packet in accordance with multiprotocol label stacking (MPLS) OAM protocol; and when the packet comprises the delimiter label, forward the packet to a customer network interface device without removing the customer network label stack from the packet.

\* \* \* \* \*